US011036554B1

(12) United States Patent
Prock et al.

(10) Patent No.: US 11,036,554 B1
(45) Date of Patent: Jun. 15, 2021

(54) AUTHORIZED VIRTUAL COMPUTER SYSTEM SERVICE CAPACITY ACCESS

(71) Applicant: Amazon Technologies, Inc., Seattle, WA (US)

(72) Inventors: Leslie Andrew Prock, Seattle, WA (US); Diwakar Gupta, Seattle, WA (US); Jeremy Truelove, Seattle, WA (US); Zachary Christopher Mouri, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 16/365,327

(22) Filed: Mar. 26, 2019

(51) Int. Cl.
*G06F 9/50* (2006.01)
*H04L 9/32* (2006.01)
*H04L 9/08* (2006.01)
*G06F 9/455* (2018.01)

(52) U.S. Cl.
CPC ........ *G06F 9/5027* (2013.01); *G06F 9/45558* (2013.01); *H04L 9/0838* (2013.01); *H04L 9/3213* (2013.01); *H04L 9/3247* (2013.01); *G06F 2009/45587* (2013.01); *G06F 2009/45595* (2013.01); *G06F 2209/5011* (2013.01); *G06F 2209/5013* (2013.01); *G06F 2209/5014* (2013.01)

(58) Field of Classification Search
CPC ....... G06F 9/45558; G06F 2009/45587; G06F 9/50; G06F 2209/5011; G06F 9/5027; G06F 2209/5013; H04L 9/08
See application file for complete search history.

(56) References Cited

U.S. PATENT DOCUMENTS

| 9,641,522 | B1 * | 5/2017 | Aung | H04L 63/0807 |
|---|---|---|---|---|
| 9,756,050 | B1 * | 9/2017 | Brandwine | H04L 63/102 |
| 2005/0120214 | A1 * | 6/2005 | Yeates | H04L 63/08 |
| | | | | 713/171 |
| 2005/0138621 | A1 * | 6/2005 | Clark | G06F 9/52 |
| | | | | 718/100 |
| 2006/0080546 | A1 * | 4/2006 | Brannon | H04L 9/3239 |
| | | | | 713/185 |
| 2013/0042115 | A1 * | 2/2013 | Sweet | H04L 63/20 |
| | | | | 713/176 |
| 2013/0086645 | A1 * | 4/2013 | Srinivasan | H04L 63/0815 |
| | | | | 726/4 |
| 2015/0363774 | A1 * | 12/2015 | Priebatsch | G06Q 20/38215 |
| | | | | 705/75 |
| 2017/0118241 | A1 * | 4/2017 | Call | H04L 67/22 |
| 2017/0286268 | A1 * | 10/2017 | Lincoln | G06F 11/366 |

* cited by examiner

*Primary Examiner* — Tuan C Dao
(74) *Attorney, Agent, or Firm* — Davis Wright Tremaine LLP

(57) ABSTRACT

A first request to reserve a quantity of resources that comply with a constraint specified in the first request is obtained. A set of available resources that fulfills the constraint is determined based on current capacity usage. A token is associated with the set of available resources, with the token being associated with an expiration. The quantity of resources from the set of available resources is reserved, where the quantity allocated is unavailable, until the expiration, to fulfill resource requests that lack the token. The token is provided in response to the first request.

20 Claims, 8 Drawing Sheets

| Standard Virtual Machine Instance Type | | | | |
|---|---|---|---|---|
| Name | vCPU | Memory (GB) | Storage (TB) | Benchmark |
| Small | 1 | 16 | 4 | 17 |
| Medium | 2 | 32 | 6 | 30 |
| Large | 4 | 64 | 8 | 54 |

| Memory Optimized Virtual Machine Instance Types | | | | |
|---|---|---|---|---|
| Name | vCPU | Memory (GB) | Storage (TB) | Benchmark |
| Small | 4 | 64 | 4 | 65 |
| Medium | 8 | 128 | 6 | 131 |
| Large | 16 | 256 | 8 | 283 |

AUTHORIZED VIRTUAL COMPUTER SYSTEM SERVICE CAPACITY ACCESS

BACKGROUND

In various contexts, managing computing resources is of utmost importance for many computing resource service providers. Computing resource service providers often maintain data centers of computing resources at various geographic locations that provide various computing services their customers. Often times, customers of the computing resource service provider who make requests for specific types of computing resources or make requests for computing resources located at a specific location are notified that capacity is insufficient to fulfill the request because the specific types or the specific location requested have insufficient capacity to fulfill the customers' request, even though other types of computing resources or resources found in an alternative location would have satisfied all of the requirements of the request and the customer. Providing the customers with the ability to take advantage of alternative resources or of the alternative locations presents a challenge, especially when large amounts of customers and requests are involved.

BRIEF DESCRIPTION OF THE DRAWINGS

Various techniques will be described with reference to the drawings, in which.

DETAILED DESCRIPTION

Figure 1:
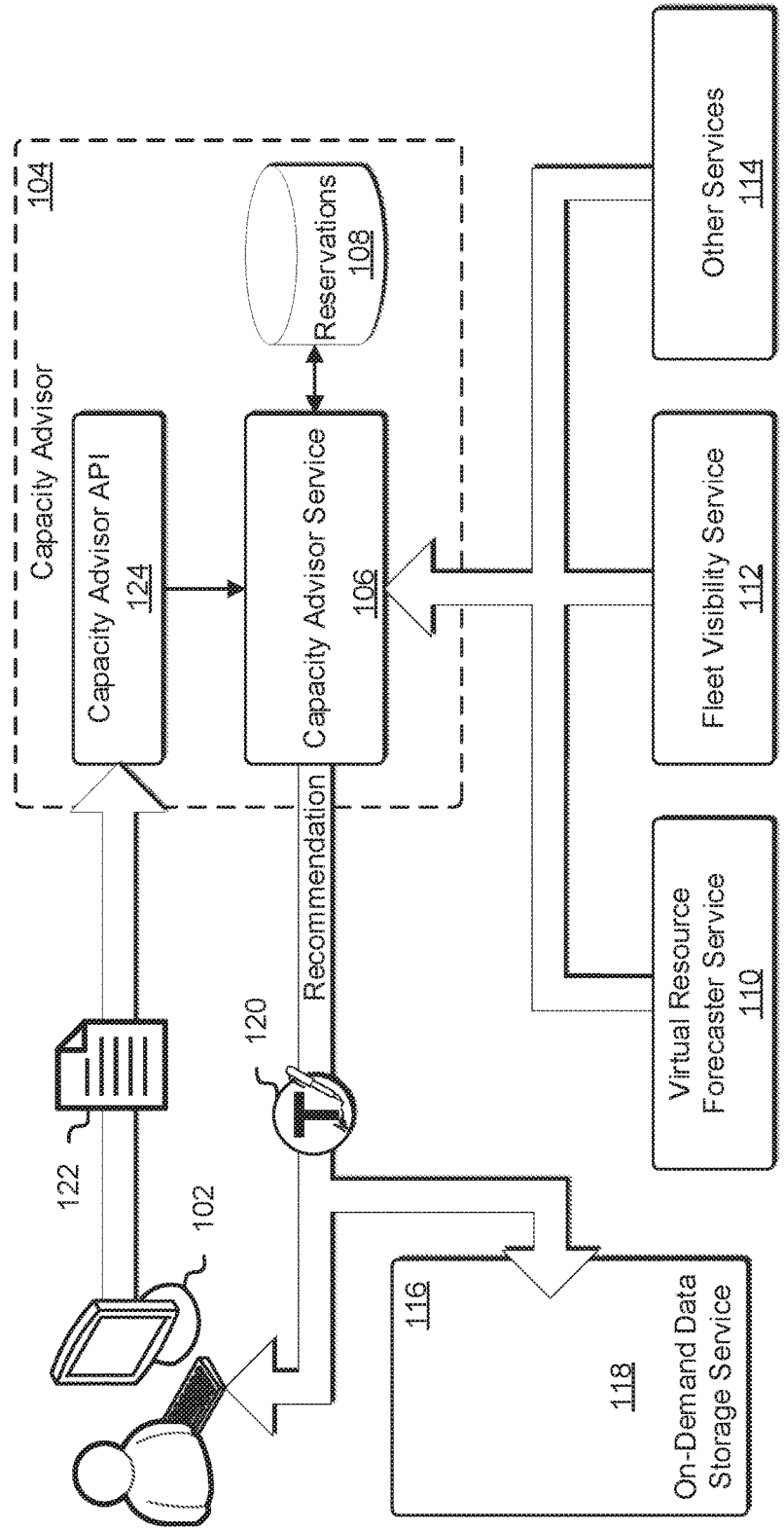
FIG. 1 illustrates an example of receiving a capacity authorization token in response to a request for capacity in accordance with an embodiment.

Techniques and systems described below relate to providing customers of a computing resource service provider with a voucher in the form of a limited-use token that can be redeemed for temporarily reserved computing resources. Some users of the computing resource provider can request capacity in terms of static pools, where such pools represent for example resources of a particular type, resources within a particular availability zone, and the like. For users who are flexible with respect to which pool they use to launch their resource(s), certain systems may advise the user on whether the current unused capacity of different pools is sufficient to host the requested resources. However, this does not guarantee that there will still be sufficient capacity when the user goes to actually request the resources after receiving the capacity advice, particularly when many users request capacity advice relating to the same pools of resources. This can lead to a bad user experience, as the user is initially provided with capacity advice indicating that their request can be handled, but then is subsequently denied access to the requested resources due to unavailable capacity.

The aforementioned problems, among others, are addressed by the disclosed techniques which can base capacity advice on both the actual unused capacity of the computing system and on data indicating which portions of that unused capacity are in a reserved state. As used herein, the reserved capacity is logged in the capacity advising system as being associated with a previous resource request, however it may not actually be reserved on the fleet of computing resources. The requested capacity can remain in the reserved state until expiration of a token granted together with the capacity advice, and such tokens can be used to limit the capacity granted when resource provisioning is requested. Beneficially, providing capacity advice in this manner can reduce the likelihood that the recommended resource(s) becomes unavailable between the time when the user receives the capacity advice and when the user requests to provision the resource(s).

To illustrate, in one example, a first request for a capacity pool recommendation is received from a requestor via an application programming interface. In this example, the request specifies a set of capacity constraints (e.g., the type(s) of requested computing resource, where the requested resource should be physically located, any networking groups associated with the requested resource). In the example, the capacity pool recommendation is determined based on a set of available virtual machine instances, the set of capacity constraints, and a record of currently reserved capacity. In some examples, the term "virtual machine instance" refers to a virtual machine that is instantiated and executing on a host computer system. The virtual machine instances may be used for various purposes, such as to operate as servers supporting a website, to operate business applications or, generally, to serve as compute power for the customer. Other applications for the virtual machine instances may be to support database applications, electronic commerce applications, business applications, and/or other applications.

Continuing with the above example, the set of available virtual machine instances is provided by a computing resource service provider to customers of the computing resource service provider. Further, in the example, the capacity pool recommendation includes a type of virtual machine instance and a quantity of the set of available virtual machine instances that fulfill the set of capacity constraints. Then, in the example, the capacity advise system can generate a capacity authorization token that encodes the capacity pool recommendation and update a record of current reservations to reflect the capacity encoded in the token. The capacity authorization token can be digitally signed using a cryptographic key of the computing resource service provider to represent its authenticity to downstream systems, for example resource launching systems that can use the token to provision resources requested by the user on the computing fleet. In some embodiments, the capacity authorization token can be valid only for a specified duration of time. In the example, the quantity of the set of available virtual machine instances is reserved in the records of the capacity advice system for the duration of time before being released. This capacity authorization token can be provided to the requestor in response to the first request.

Next in the example, a second request to launch one or more virtual machine instances is received. The second request, in the example, is determined to include the capacity authorization token. Still in the example, the duration of time of the capacity authorization token is validated to have not expired. Additionally in the example, a digital signature of the capacity authorization token is validated as valid based on the cryptographic key. The capacity authorization token is further validated in this example to be at least partially unredeemed. Finally, in the example, as a result of the validating, the capacity authorization token is at least partially redeemed by launching, for the customer, a subset of the set of available virtual machine instances, where a size of the subset is constrained at least in part by the quantity.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. For example, although certain examples focus on the request of virtual machines, the disclosed capacity advice techniques can be applied in the context of other virtualized computing resources (e.g., storage, database, networking, or combinations of resources). Furthermore, well-known features may be omitted or simplified to avoid obscuring the techniques being described.

FIG. 1 illustrates an aspect of a system 100 in which an embodiment may be practiced. As illustrated in FIG. 1, the system 100 may include a client 102 that submits a recommendation request 122 to a capacity advisor 104 via a capacity advisor application programming interface (API) 124 for a recommendation that specifies a set of virtual machine instances that is available to meet criteria specified in the request. A capacity advisor service 106 of the capacity advisor 104 determines, based on information received from a reservations data store 108, a virtual resource forecaster service 110, a fleet visibility service 112, and/or other services 114 to determine a recommendation and generate a capacity authorization token 120 that corresponds to the recommendation. The capacity advisor service 106 provides the capacity authorization token 120 to the client 102 and stores a record of generated token in a data store 118 of an on-demand data storage service 116.

In an embodiment, the client 102 is any entity operable to access systems and/or services such as the capacity advisor 104 and on-demand data storage service 116. In some embodiments, the client 102 is a device operated by a customer of a computing resource service provider that hosts one or more of the systems depicted in FIG. 1. The customer may be an individual, group of individuals, business entity or other organization that has a business relationship with the computing resource service provider of the various systems and/or services. In the present disclosure, it is contemplated that use of the term "client" can include a computing device (also referred to as a "client device") used to perform operations under the control of or on behalf of the client (e.g., to access a service and/or system). Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a client-accessible virtual machine hosted on one or more computer servers, or other computing system capable of communicating with various systems and/or services. In some examples, a "service" refers to an executing computer application that provides functionality to another computer application.

In some embodiments, the computing resource service provider is an entity that provides to its customers one or more computing resource services individually or as a combination of services of a distributed computer system. Examples of types of computing resources provided by the computing resource service providers include Infrastructure-as-a-service (IaaS), platform-as-a-service (PaaS), and/or software-as-a-service (SaaS). The one or more computing resource services of the computing resource service provider may be accessible to users via a network and may include services such as virtual computer system services, block-level data storage services, cryptography services, on-demand data storage services, notification services, authentication services, policy management services, task services and/or other such services. Not all embodiments described include all of the services described, and additional services may be provided in addition to, or as an alternative to, services explicitly described.

Customers of the computing resource service provider may communicate with one or more of the services via an interface, which may be a web services interface or any other type of customer interface. Each service provided by a computing resource service provider may have its own interface, and subsets of the services may have corresponding individual interfaces in addition to, or as an alternative to, a common interface. A customer may communicate with the computing resource service provider through a network, whereby the network may be a communication network, such as the Internet, an intranet, an internet service provider (ISP) network and/or some other such network as described in the present disclosure. In an embodiment, the computing resource service provider provides services such as the capacity advisor 104, virtual resource forecaster service 110, fleet visibility service 112, other services 114, and on-demand data storage service 116.

The client 102 may communicate to the various systems and/or services through one or more communication networks, such as the Internet. Further, the various communications to/from the client 102 may be orchestrated by a browser or other application executing on a device the client 102 may comprise. In an embodiment, the client 102 communicates to the capacity advisor 104 through the one or more APIs such as the capacity advisor API 124. In some examples, the capacity advisor API 124 may be a set of subroutine definitions, communication protocols, and/or software tools that provide a method of communication to/from the client 102 and the capacity advisor 104.

The recommendation request 122 (also referred to as a request for a capacity pool recommendation) may be a request for capacity from the "pool" of computing resource capacity maintained by the computing resource service provider. The request may include various criteria that may be satisfied by a set of virtual machine instances that could be implemented using the computing resources from the pool. In some embodiments, the recommendation request 122 is a request from the client 102 for computing resource capacity. For example, the client 102 may require a set of virtual machines to perform various functions and operations and submits the recommendation request 122 for sufficient computing capacity to perform the various functions and operations. In some embodiments, the client 102 may require a set of virtual machines from the fleet 212 as described in connection with FIG. 2. In some embodiments, the client may specify in the recommendation request 122 that the set of virtual machines should belong to an instance type that corresponds to a particular virtual machine configuration. The recommendation request 122 may comprise a request for a recommendation of a set of virtual machines, based on various criteria, to perform the various functions and operations. In some examples, the various criteria can include various desired factors, such as memory requirements, storage requirements, processing capabilities, graphical capabilities, and/or variations thereof. In some embodiments, the recommendation request 122 may be submitted to the capacity advisor 104 via the capacity advisor API 124 in the form of an API call from the client 102.

The capacity advisor 104 may be a collection of computing resources, physical and/or virtual, configured to provide a recommendation for a set of virtual machines based on a recommendation request 122. In various embodiments, the capacity advisor 104 may comprise one or more instances of a physical computing instance, such as a physical server computer, or one or more instances of a virtual computing instance, such as a virtual machine, which may be hosted on one or more computer servers. The capacity advisor 104 may comprise various services, such as the capacity advisor service 106, and/or various other services and applications. The capacity advisor service 106 may be a service configured to analyze various services to determine a recommendation for a set of virtual machines based on the recommendation request 122 received via the capacity advisor API 124. The capacity advisor service 106 may be a service that the capacity advisor 104 comprises, and may communicate received criteria from the recommendation request 122 to the virtual resource forecaster service 110, fleet visibility service 112, other services 114, the reservations data store 108, and/or other various services to determine its recommendation.

The virtual resource forecaster service 110 may be a service configured to provide estimations of suitable sets of virtual machines based on received criteria. In some embodiments, the virtual resource forecaster service 110 provides forecasted estimations of various sets of virtual machines that satisfy the criteria received in the recommendation request 122. For example, the client 102 may submit the recommendation request 122 comprising specific criteria for the performance of a specific application. The virtual resource forecaster service 110 may utilize the specific criteria to determine which sets of virtual machines, based on information provided by the fleet 212 of FIG. 2, satisfy the specific criteria. The virtual resource forecaster service 110 may predict/forecast the availability and/or usage of various of memory, storage, processing power, and/or other capacity based on the recommendation request 122, and may provide forecasted usage capacity information about sets of virtual machine instances that satisfy the various requirements. In an embodiment, the capacity advisor service 106 utilizes data received from the virtual resource forecaster service 110 to determine its recommendation.

The fleet visibility service 112 may be a service that monitors one or more fleets of virtual machines, such as the fleet 212, and provides indications of the available sets of virtual machines. In various embodiments, sets of virtual machines are stored in the fleet 212. The fleet visibility service 112 may continuously iterate over the resources stored in the fleet 212 to determine which of the resources are available to be utilized and/or which sets of virtual machines are available to be utilized and provide this current usage capacity information to the capacity advisor service 106. Likewise, the fleet visibility service 112 may provide the capacity advisor service 106 with information regarding the quantity and type of virtual machines (and/or other resources) in current use by the client 102. The other services 114 may be one or more other services of the computing resource service provider that provide information to the capacity advisor service 106. In various embodiments, the information provided by the other services 114 is utilized by the capacity advisor service 106 to make its recommendation of a set of virtual machine instances. Although FIG. 1 illustrates the capacity advisor service 106 as receiving information from which it bases its recommendation from the virtual resource forecaster service 110, the fleet visibility services, and the other services 114, it is contemplated, that such information may be received from more, from fewer, or from different sources from those depicted.

In an embodiment, based on the reserved capacity information received from the reservations data store 108, the forecasted usage capacity information from the virtual resource forecaster service 110, current usage capacity information from the fleet visibility service 112, the information from other services 114, and/or information from other various services, the capacity advisor service 106 determines a suitable set of virtual machine instances. In the present disclosure, "usage capacity" may refer to one or more of the reserved capacity, forecasted usage capacity, or current usage capacity. For example, the capacity advisor service 106 may utilize the virtual resource forecaster service 110 to determine, based on criteria in the recommendation request 122, various suitable sets of virtual machine instances that are forecasted to be available and meet the criteria for the duration or time range to reserve for the capacity authorization token 120. The capacity advisor service 106 may then utilize the fleet visibility service 112 to determine which of the various suitable sets of virtual machine instances are available. The capacity advisor service 106 may utilize the available sets of virtual machine instances in the other service 114 to determine a suitable set of virtual machine instances that satisfy the requirements and criteria the recommendation request 122 comprises. The capacity advisor service 106 may generate a capacity authorization token 120 corresponding to the determined suitable set of virtual machine instances. In an embodiment, access to the suitable set of virtual machine instances is provided to the client 102 via the capacity authorization token 120.

In various embodiments, the capacity advisor service 106 may determine various suitable sets of virtual machine instances that satisfy the requirements and criteria specified in the recommendation request 122. The capacity advisor service 106 may present these sets of virtual machine instances to the client 102; the client may chose a desired set of virtual machine instances from the presented sets. Based on the chosen set of virtual machine instances, the capacity advisor service 106 may generate a capacity authorization token 120 corresponding to the chosen suitable set of virtual machine instances and provide the capacity authorization token 120 to the client 102.

Figure 7:
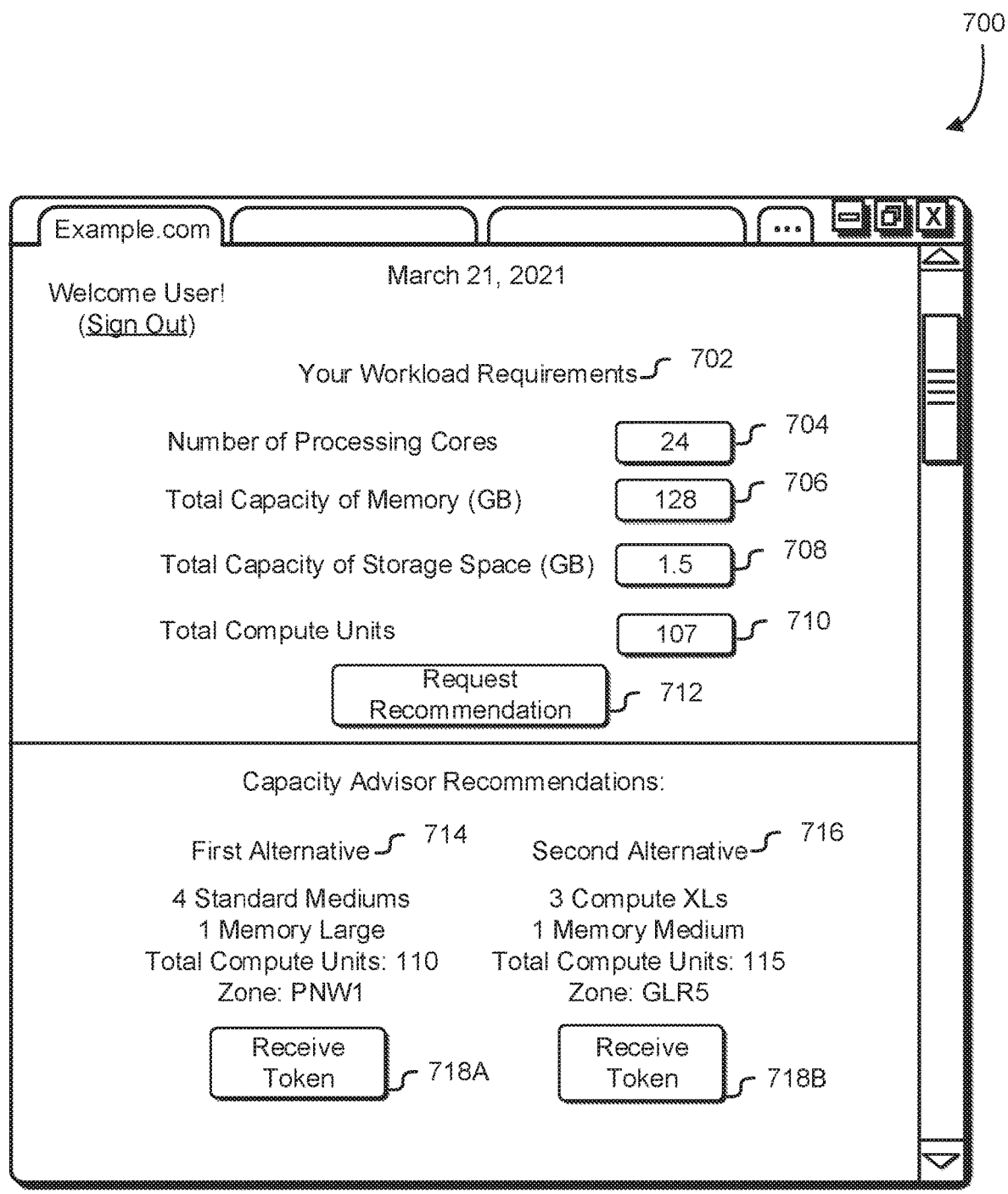
FIG. 7 illustrates an example of a webpage enabling customers to select alternative capacity authorization tokens in accordance with at least one embodiment.

The capacity authorization token 120 (also referred to as "token" for short) may be an authorization token that authorizes the user of the token to access a specific set of virtual machine instances. The capacity authorization token 120 may encode information such as a type of resource (e.g., one of the instance types of FIG. 3), a quantity of the type of resources reserved to the capacity authorization token 120, a quantity of resources utilized by the requestor of the token, and a time period (e.g., a duration of time from issue, a specified time since epoch, a time range specified by a start time and an end time). Note that although the present disclosure at times refers to a quantity of resources being reserved, in many embodiments this refers to a sufficient amount of hardware resources (e.g., processing cores, compute units, memory, storage space, etc., such as illustrated in FIG. 7) being reserved/allocated to fulfill resource requests for the quantity of the type of resources specified in the capacity authorization token 120. In this manner, the quantity of resources reserved, such as virtual machine instances, need not be actually sitting idle for the duration of the token. Additionally, the quantity of resources reserved may be tracked by the capacity advisor 104 in internal memory or an internal data store, such as the reservations data store 108.

In some embodiments, the reservations data store 108 may be a repository for data object, such as database records, flat files, or other data objects. Examples of such repositories include file systems, relational databases, non-relational databases, object-oriented databases, comma-delimited files, and other such storage implementations. The reservations data store 108 may be used by the capacity advisor service 106 to keep track of capacity that has been reserved for tokens (also referred to as "reserved capacity"), such as the capacity authorization token 120. In determining whether there is sufficient capacity to fulfill the recommendation request 122, the capacity advisor service may take into account the information received from the virtual resource forecaster service 110, fleet visibility service 112, and other services 114, as well as referring to the reservations data store 108 to determine what capacity has already been reserved to other customers, and in this way the capacity advisor service 106 is able to keep from double-reserving the same capacity for more than one customer. Upon expiration of the capacity authorization token 120, the corresponding capacity reservation in the reservations data store 108 may be expired or deleted. Note that, in various embodiments, the capacity reservations in the reservations data store 108 may not actually correspond to actual capacity having been reserved with a fleet (e.g., by allocating an available slot on a computing device to a resource), such as the fleet 212 of FIG. 12, but may be used by capacity advisor service 106 for tracking purposes to avoid overlapping capacity reservations. Thus, the data in the reservations data store 108 represents portions of the unused capacity of the fleet that have been allocated to unexpired tokens. In this way, the capacity advisor service 106 can provide capacity reservations based on both the current unused capacity of the fleet and the potential usage of that unused capacity by reservations that have been previously provided.

In some embodiments, the recommendation request 122 and the capacity authorization token 120 is not limited to requests for virtual machine instances. For example, additionally or alternatively, the recommendation request could be a request for a quantity of block-level data storage volumes, a request for software containers, or a request for some other such computing resource provided as a service by the computing resource service provider, and the capacity advisor 104 may reserve the requested resources and generate the capacity authorization token 120 to specify the reserved resources. In some embodiments, the recommendation request 122 and the capacity authorization token 120 may include multiple types of resources. For example, the customer could specify, and the capacity authentication token could be issued to a first quantity of a first type of virtual machine instance, a second quantity of a second type of virtual machine instance, and a third quantity of a third type of storage volume (e.g., for use by the virtual machine instances to store information). In still other embodiments, the recommendation request 122 for multiple types of computing resources may be conditional. For example, the client 102 may specify that the customer requires a first quantity of a type of virtual machine instance, but only to reserve the first quantity if a second quantity of a type of storage is likewise available and/or reserved; in such a case, the second quantity of the type of storage would be a condition precedent on reserving the first quantity of the type of virtual machine instance.

As noted above, in embodiments the capacity authorization token 120 may expire according to an expiration time. In some embodiments, each capacity authorization token 120 issued by the capacity advisor service 106 expires after a fixed amount of time (e.g., 10 minutes, 24 hours, etc.). In other embodiments, the expiration of the capacity authorization token 120 is given an expiration that depends on the identity of the customer associated with the client 102. For example, some customers may be subscribed to premium services from the computing resource service provider and along with the premium services may be allowed longer time (e.g., 24 hours, 48 hours, etc.) to use their capacity authorization token 120. On the other hand, some customers may be subscribed to only basic services and may consequently have a shorter period (e.g., 10 minutes, 6 hours, etc.) within which to use their capacity authorization token 120.

In some embodiments, the expiration may be dynamically determined based on current capacity or projected capacity of the requested resource. For example, if the fleet visibility service 112 notifies the capacity advisor service 106 that the fleet hosting the resource type has an overabundance of resources available or if the virtual resource forecaster service notifies the capacity advisor service 106 that projected resource usage is likely to be low for some time, the capacity advisor service 106 may generate the capacity authorization token to have a relatively long active duration (e.g., 24 hours before expiration). Conversely, if the fleet visibility service 112 and/or virtual resource forecaster service 110 notifies the capacity advisor service 106 that usage/demand of the sought after resource type is high and projected to remain high, the capacity advisor service 106 may generate the capacity authorization token 120 to have a relatively short duration (e.g., 10 minutes before expiration). In this way, the expiration of the capacity authorization token can be flexible to adjust to current and projected conditions of the computing resource service provider.

Further, in some embodiments the client 102 may request a token good for a particular time range in the future. For example, the client 102 may indicate to reserve a set of resources beginning at a start time of 12:00 AM next Friday and continuing until 12:00 AM the following Sunday. The capacity advisor service 106 may generate the capacity authorization token 120 to have such a start time and end time such that the capacity authorization token 120 can only be used within that time range. In this manner, customers of the computing resource service provider can reserve resources ahead of time in order to have some protection against unexpected or expected demand within that time to ensure that needed capacity is not consumed by other customers of the computing resource service provider.

In some embodiments, the capacity authorization token 120 can comprise authorization tokens such as JavaScript Object Notation (JSON) Web Tokens (JWT), and/or various other access tokens. An example of such a token might be:

{
  "iss": "capacityadvisor",
  "exp": 1300819380,

"acc": "123456789012",
"type": "memory.large",
"zone": "pnw7",
"tenancy": "shared",
"addressing": "nat",
"needed": 10,
"used": 120
}

Where "iss" refers to the issuer of the capacity authorization token 120 (e.g., capacity advisor 404), "exp" refers to the expiration of the token (e.g., in seconds since epoch), and "sub" refers to an identifier that refers to the account of the requestor (e.g., customer 402). In the example token, "type" refers to the resource type (e.g., one of the instance types of FIG. 3), "zone" refers to a geographic area where a data center hosting the resources is located, "tenancy" refers to whether the physical hardware hosting the resources will be multi-tenant (e.g., shared with other customers) or will be allocated for exclusive use (e.g., by the customer 402), and "addressing" refers to the type of networking. Also in the example token, "needed" refers to the number of resources the customer 402 seeks to reserve and "used" refers to the number of resources currently used by the customer 402.

In some embodiments, the client 102, in the recommendation request 122, may specify at least one usage (also referred to in the present disclosure as "utility") for the capacity authorization token 120. For example, one type of usage may be for "on-demand" launching of virtual machine instances. Another type of usage may be for adding additional virtual machine instances to an existing purchased reservation of virtual machine instances (e.g., the customer has a service agreement with the computing resource service provider that reserves 30 virtual machine instances for the customer's use for 1 year, and the customer requests, via the recommendation request 122, a token that can be used to add an additional 10 instances to the customer's current plan). Other types of usages and other types of resources are contemplated in the present disclosure. The requested usage/utility may be encoded in the capacity authorization token 120 such that the token is usable for that usage/utility and, if the client 102 attempts to redeem the capacity authorization token 120 for a different usage/utility, the redeem request may be rejected (e.g., by the admission control service 204 of FIG. 2). In some embodiments, the duration/expiration of the capacity authorization token 120 varies depending on the usage/utility of the token.

It is also contemplated that the customer may request multiple usages for the token, such that the token may be encoded with more than one usage. For example, the client 102 may request, and be granted a capacity authorization token 120 for, launching up to 10 on-demand virtual machine instances and/or up to 20 additional purchased reservation virtual machine instances. In some implementations, each usage/utility within the capacity authentication token may have a different expiration/duration. Likewise, in some implementations, depleting one requested usage/utility does not necessarily expire the capacity authorization token 120, which may still be usable for another requested usage encoded in the token that is not depleted or expired.

In some embodiments, the capacity authorization token 120 may not be encrypted; for example, if the capacity authorization token 120 contains no sensitive customer information. In other implementations, however, the capacity authorization token 120 may be encrypted using a cryptographic key in a manner such that the capacity authorization token 120 can be decrypted by entities that need read access to the capacity authorization token 120, such as the client 102 and/or admission control service 204 of FIG. 2.

In an embodiment, the capacity authorization token 120 comprises cryptographically signed ephemeral credentials that grant access to specified resources, such as a set of virtual machine instances. Cryptographic operations that may be performed in various embodiments include, but are not limited to, digital signature generation, digital signature verification, encryption, decryption, and random number generation. Operations that utilize cryptographic keys include, but are not limited to, public key and/or private key cryptographic algorithms. For example, as discussed, numerous variations utilize symmetric and/or asymmetric cryptographic primitives.

Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Example modes of block ciphers include, but are not limited to, the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode. Symmetric key algorithms may also include those used to generate output of one-way functions and include but are not limited to algorithms that utilize hash-based message authentication codes (HMACs), message authentication codes (MACs) in general, PBKDF2 and Bcrypt.

Asymmetric key algorithms may also include various schemes for performing cryptographic operations on data. Example algorithms include but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the Rivest-Shamir-Adleman (RSA) encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme.

The capacity authorization token 120 may comprise various digital signatures that may be authenticated through the usage of various asymmetric cryptographic schemes, using algorithms such as those described above. Other algorithms and combinations of algorithms are also considered as being within the scope of the present disclosure and the above is not intended to be an exhaustive list. In some embodiments, the capacity authorization token 120 may be utilized to gain access to a set of virtual machine instances that satisfies criteria the recommendation request 122 comprises.

The on-demand data storage service 116 may be a collection of computing resources configured to synchronously process requests to store and/or access data. The on-demand data storage service 116 may allow data to be provided in responses to requests for the data and may operate using computing resources (e.g., databases) that enable the on-demand data storage service to locate and retrieve data quickly. For example, the on-demand data storage service 116 may maintain stored data in a manner such that, when a request for a data object is retrieved, the data object can be provided (or streaming of the data object can be initiated) in a response to the request. As noted, data stored in the on-demand data storage service 116 may be organized into data objects. The data objects may have arbitrary sizes except, perhaps, for certain constraints on size.

The data store 118 may be a data store that the on-demand data storage service 116 comprises. In various embodiments, the data store 118 may comprise a log of authorization tokens, such as the capacity authorization token 120, generated by the capacity advisor service 106. The data store 118 may comprise copies of the tokens generated, and may also comprise as various characteristics of the tokens, such as the validity of the token, the expiration of the token, various cryptographic schemes utilized by the tokens, and/or variations thereof, and may be utilized to verify and/or validate the capacity authorization token 120. In this manner, the capacity advisor service 106 and other services involved in embodiments of the present disclosure, such as the admission control service 204 of FIG. 2, can query the data store 118 to track, update, and determine the current status of issued capacity authorization tokens.

Figure 2:
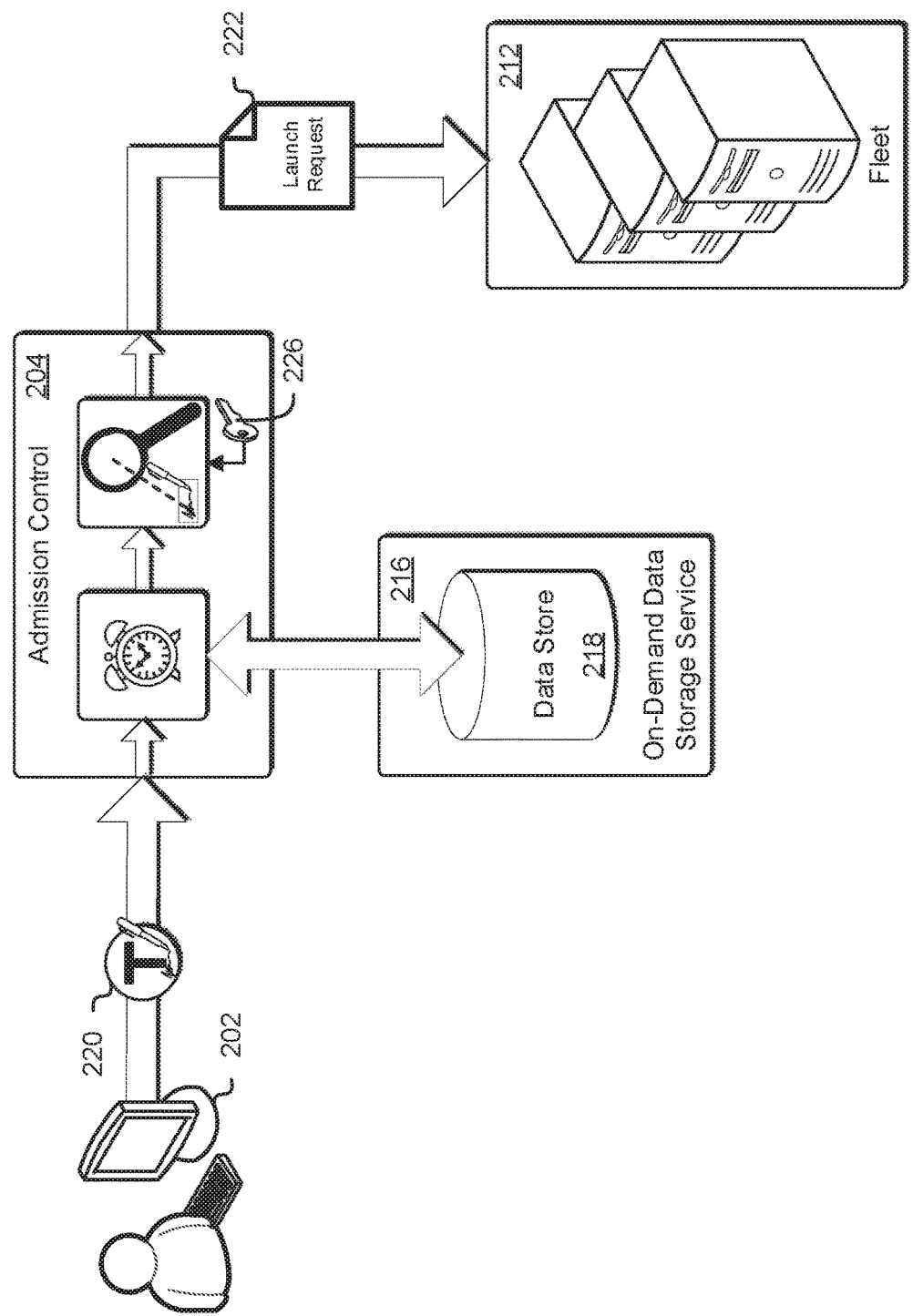
FIG. 2 illustrates an example of processing a capacity request with a capacity authorization token in accordance with an embodiment.

FIG. 2 illustrates an aspect of a system 200 in which an embodiment may be practiced. As illustrated in FIG. 2, the system 200 may include a client 202 that submits a capacity authorization token 220 to an admission control service 204 that validates the capacity authorization token 220 by determining, based on an associated record that is stored with a data store 218 at an on-demand data storage service 216 whether the capacity authorization token 220 is valid and unexpired. The admission control service 204 further verifies, using a cryptographic key 226 of the computing resource service provider that manages the admission control service 204, whether the digital signature included with the capacity authorization token is valid. If the capacity authorization token 220 is successfully verified, the admission control service 204 sends a launch request 222 to a fleet 212 to cause the fleet 212 to launch a set of virtual machine instances in accordance with parameters specified in the capacity authorization token 220.

The client 202 may be any entity operable to access systems and/or services such as the admission control service 204. In some embodiments, the client 202 is a device operated by a customer of a computing resource service provider that hosts one or more of the systems depicted in FIG. 1 and FIG. 2. The customer may be an individual, group of individuals, business entity or other organization that has a business relationship with the computing resource service provider of the various systems and/or services. In an embodiment, the computing resource service provider provides services such as the admission control service 204, on-demand data storage service 216, and fleet 212. In an embodiment, the client 202 is the same as or different from the client 102 described in connection with FIG. 1.

The capacity authorization token 220 may be an authorization token that authorizes the user of the token to access a specific set of virtual machine instances. In some embodiments, the capacity authorization token 220 may comprise authorization tokens such as JSON Web Tokens and/or various other access tokens. As described above, the capacity authorization token 220 may comprise various digital signatures that may be authenticated through the usage of various asymmetric cryptographic schemes (e.g., using the RSA cryptosystem, the ECDSA cryptosystem, etc.), and/or variations thereof. In an embodiment, the capacity authorization token 220 is the same as or different from the capacity authorization token 120 described in connection with FIG. 1. In embodiments, the capacity authorization token 220 encodes information about various resources that have been reserved for a limited time (e.g., until an expiration time, between a specified time range, etc.) for the customer associated with the client 202.

Thus, the capacity authorization token 220 may be accompanied by a request, such as the launch request 222, from the client 202 specifying to instantiate, allocate, or otherwise grant access to one or more of the resources indicated in the capacity authorization token 220. Note that the capacity authorization token may include a specified quantity of the one or more of the various resources that have been reserved for the client 202. Thus, the request may specify to launch up to the specified quantity of the reserved resources, but may alternatively specify to redeem only a portion of the capacity authentication token by launching fewer than the specified quantity.

In some embodiments, if the request specifies to launch fewer than the specified quantity, a quantity of the remaining specified reserved resources can be requested at a time in the future using the same capacity authorization token 220. If the capacity authorization token 220 is used to authorize the launch of fewer than the quantity of resources reserved, the admission control service 204 may update the current status of the capacity authorization token 220 in the data store 218 to reflect the quantity of reserved resources remaining. In some implementations, however, the capacity authorization token 220 is single-use, and upon use, the admission control service 204 updates the record of the capacity authorization token 220 in the data store 218 to automatically expire the capacity authorization token 220.

The admission control service 204 may be a collection of computing resources configured to verify the integrity and validity of authorization tokens, such as the capacity authorization token 220. For example, the admission control service 204 may receive the capacity authorization token 220 from the client 202. The admission control service 204 may compare the capacity authorization token 220 to a log of authorization tokens that the data store 218 may comprise. Based on the information associated with the log of authorization tokens, the admission control service 204 may determine that the capacity authorization token 220 is valid and unexpired. Determining that the capacity authorization token 220 is valid may involve determining that a request to launch a quantity of resources reserved for the client 202 in association with the capacity authorization token 220 does not exceed the quantity of reserved resources remaining for the capacity authorization token 220. The capacity authorization token 220 may include information indicating an amount and/or type of virtual machine instances (or other resources) in use by the customer at the time the capacity authorization token 220 was issued, and the admission control service 204 may determine, using this information, whether the customer's current virtual machine instance usage has changed since issuance of the token.

For example, if the client 202 had, since issuance of the capacity authorization token, previously launched 6 of 10 reserved virtual machine instances (e.g., by use of an autoscaling service, using the capacity authorization token 220, or in some other manner), and subsequently attempts to use the capacity authorization token 220 to launch another 6 reserved virtual machine instances, in embodiments the request will fail because only 4 more reserved virtual machine instances remain. Otherwise, if the admission control service 204 determines that the requested computing resources does not exceed the unredeemed quantity of computing resources associated with the capacity authorization token 220, the admission control service 204 may send the launch request 222 to the fleet 212.

Alternatively, in some implementations, if the admission control service 204 determines that sufficient additional resources of the same type are available, the admission control service 204 may proceed with the launch request 222 even if the quantity of reserved resources is fewer than the number requested; for example, if the client 202 requests to launch 6 virtual machine instances and only 4 reserved virtual machine instances remain to the customer, but the admission control service 204 determines that 2 unreserved virtual machine instances of the same type are available, the admission control service 204 may cause the fleet to launch both the 4 reserved virtual machine instances and the other 2 unreserved virtual machine in fulfilment of the request.

The admission control service 204 may then utilize the cryptographic key 226 to verify the digital signatures the capacity authorization token 220 may comprise; following a verification of the digital signatures, the capacity authorization token 220 may be denoted as admissible, and a launch request 222 may be generated comprising a request of the set of virtual machine instances (or other resources) specified by the capacity authorization token 220. The admission control service 204 may then update the record of the capacity authorization token 220 in the data store 218 to reflect that the requested number of resources has been deducted from quantity of reserved resources associated with the capacity authorization token 220. In some cases, such as where no further reserved resources remain, the admission control service 204 may indicate that the capacity authorization token 220 is now expired or is otherwise no longer valid.

The on-demand data storage service 216 may be a collection of computing resources configured to synchronously process requests to store and/or access data. In an embodiment, the on-demand data storage service 216 is the same as or different from the on-demand data storage service 116 described in connection with FIG. 1. The data store 218 may be a data store that the on-demand data storage service 216 comprises. In various embodiments, the data store 218 may comprise a log of authorization tokens, such as a log of the capacity authorization token 220, which can be utilized to verify authorization tokens, such as the capacity authorization token 220. In an embodiment, the data store 218 is the same as or different from the data store 118 described in connection with FIG. 1.

The cryptographic key 226 may be a cryptographic key and/or secret that can be utilized to verify the various digital signatures the capacity authorization token 220 may comprise. In some embodiments, the cryptographic key 226 may be an asymmetric cryptographic key, such as a public key. In an embodiment, asymmetric cryptography refers to a cryptographic system that utilizes pairs of keys, denoted as public keys and private keys. Furthermore, in various embodiments, a private key may be utilized to digitally sign various data objects, and a public key corresponding to the private key may be utilized to verify the digital signatures. For example, the capacity authorization token 220 may be digitally signed by the capacity advisor service 106 of FIG. 1 utilizing the RSA cryptosystem through the usage of a privately held cryptographic key. The digital signature of the capacity authorization token 220 may then be validated by the admission control service 204 using the corresponding publicly held cryptographic key 226.

The launch request 222 may be a data object, such as a sequence of bits, which specifies various computing resources, such as a specific set of virtual machine instances, that are to be launched. In various embodiments, the launch request 222 may be utilized to allocate various resources for the client 202; the various resources for the client 202 may be managed by the fleet 212. In some embodiments, the launch request 222 may be managed by a service, such as the web service control plane 310 described in connection with FIG. 3, in which the service may utilize the launch request 222 to launch the set of virtual machine instances specified by the capacity authorization token 220 on behalf of the client 202.

The fleet 212 may be a collection of computing resources configured to manage and operate various virtual machine instances and resources. In some embodiments, the fleet 212 may comprise one or more instances of a physical computing instance, such as a physical server computer, or one or more instances of a virtual computing instance, such as a virtual machine, which may be hosted on one or more computer servers, that may be allocated to other entities. The fleet 212 may allocate these computing resources in response to requests, such as the launch request 222. Additionally, in some embodiments, the fleet 212 may comprise various types of virtual machine instances. For example, the launch request 222 may comprise a request for a set of virtual machine instances of a specific type; in response to the launch request 222, the fleet 212 may allocate the requested virtual machine instances of the specific requested type. Further information regarding the virtual machine instance types can be found in the description of FIG. 3.

Figure 3:
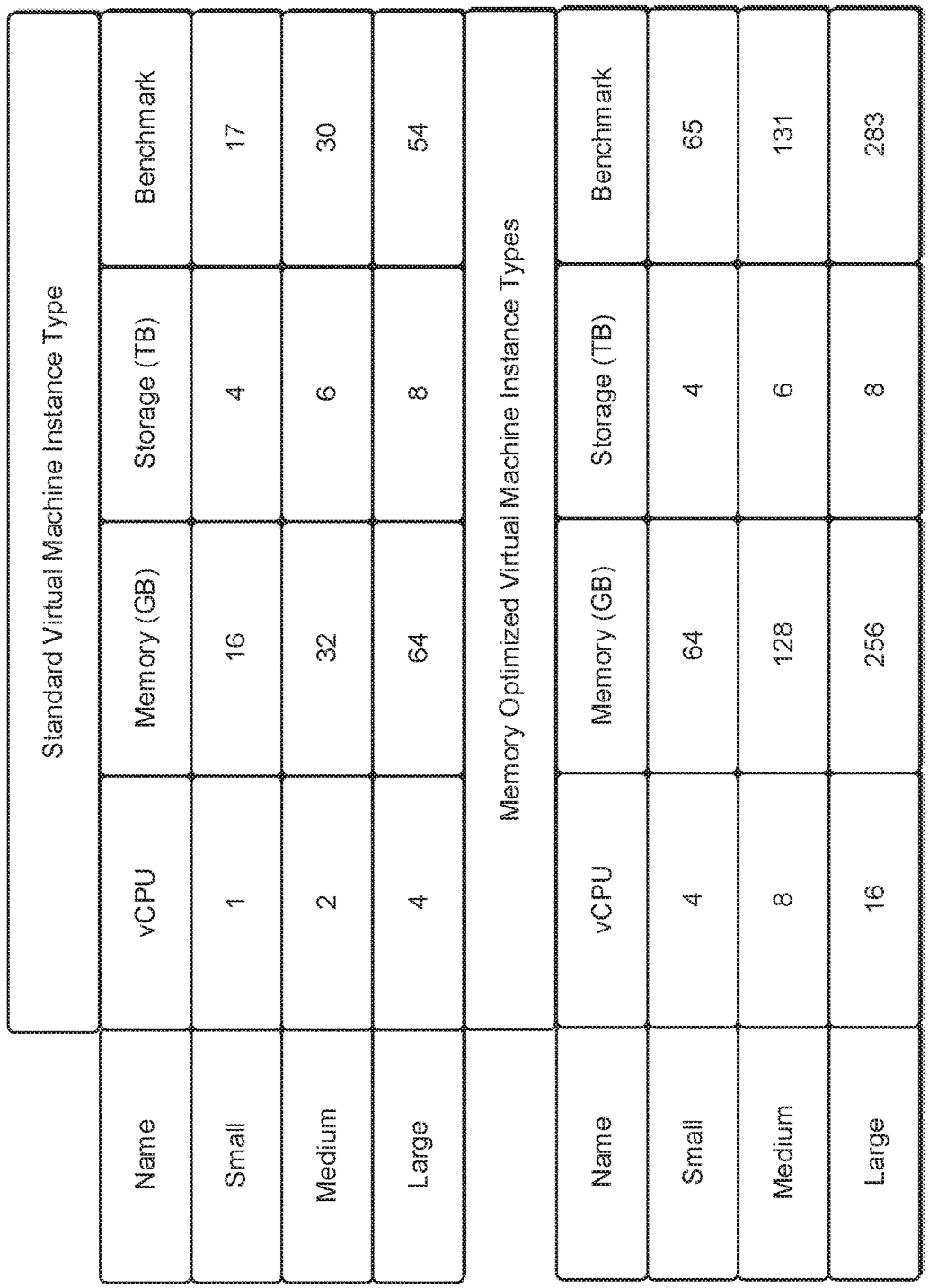
FIG. 3 illustrates an example in which information corresponding to various virtual machine instance types may be displayed in accordance with an embodiment.

FIG. 3 illustrates a table 300 in which information corresponding to various virtual machine instance types may be displayed and used by a service, such as the capacity advisor 104 described in connection with FIG. 1, to determine a configuration of virtual machine instance types suitable for executing a client workload or application in accordance with an embodiment. The table 300 may be generated by the service and may express a capacity and/or a score of various instance types. The table 300 may indicate various attributes of the virtual machine instance types, such as the number of virtual central processing units (vCPUs) allocated to the virtual machine instance type or amount of memory allocated to the virtual machine instance type. Furthermore, as illustrated by FIG. 3, benchmarks may be used to compare instance types relative to one another.

In some embodiments, the table 300 may include a score for each instance type calculated relative to other instance types. For example, a small standard instance type may be assigned a score of one unit of capacity, a medium standard instance type four units of capacity, and a large standard instance type 14 units of capacity. The unit of capacity may be assigned based at least in part on the instance types' ability to execute the client workload or application. The service and/or client may benchmark or otherwise test the various instance types performing the same client workload in order to determine the number of units of capacity relative to the other instance types.

As illustrated by the table 300, the service may evaluate and determine performance capabilities of the various instance types across multiple dimensions. The service may also select optimal configurations across one or more dimensions, for example, optimizing the configuration of virtual machine instance types based on memory, benchmarks, and cost. The cost of a particular virtual machine instance type may be fixed or the cost may fluctuate according to a market, for instance. For example, during periods of peak client usage the price of various virtual machine instance types may increase with demand for the various instance types. Alternatively, during periods of underutilization of computing resources of the computing resource service provided, the cost for a particular virtual machine instance type may decrease according to demand. In various embodiments, a scoring algorithm is used to consolidate the various dimensions included in the table 300 to a single value. In addition, other values, such as the cost of a particular virtual machine instance according to the mark as described above, may be included in the algorithm used to consolidate the various dimensions included in the table 300.

The client may also provide the service with constraints and/or requirements for the client workload or application. For example, the client may indicate to the service that application 'X' needs 10 units of overall capacity, application 'Y' needs at least five units of compute capacity and eight units of memory capacity, and workload 'Z' needs 14 combined units of memory and network throughput. Furthermore, the client may also provide constraints on the group of virtual machine instances. For example, the client may indicate a virtual machine instance group with no more than eight and no fewer than four virtual machine instances and using no more than two different types of virtual machine instances. Additionally, the client may express constraints such as total cost or elapsed time. For example, the client may indicate that workload 'X' may require at least 10 units of capacity for 20 capacity-hours of work, such that a virtual machine instance group with 10 units of capacity can complete the workload in two hours or a virtual machine instance group with 20 units of capacity can complete the workload in an hour. In another example, the client may indicate that application 'Y' may need to acquire an amount of capacity sufficient to execute the application for the lowest available price or for no more than $10 per hour of execution.

Other constraints may be determined by the service or other service of the computing resource service provider. For example, if a particular client workload or application includes a database with a maximum of 20 simultaneous connections, the service may limit that total number of virtual machine instances in the configuration of virtual machine instance types to less than 20. In another example, the number of virtual machine instances in the configuration of virtual machine instance types may be limited to the number Internet Protocol (IP) address available to the client. The table 300 and client constraints and/or requirements may be provided by the service to one or more other services of the computing resource service provider. An auto-scale service or load balancing service may be provided with the table 300 and perform various operations based at least in part on the information included in the table 300. For example, a load balancing service may distribute load according to the capacity information included in the table 300. In another example, the auto-scale service may add virtual machine instances of a particular type to an auto-scale group based at least in part on the table 300 and client constraints and/or requirements.

Figure 4:
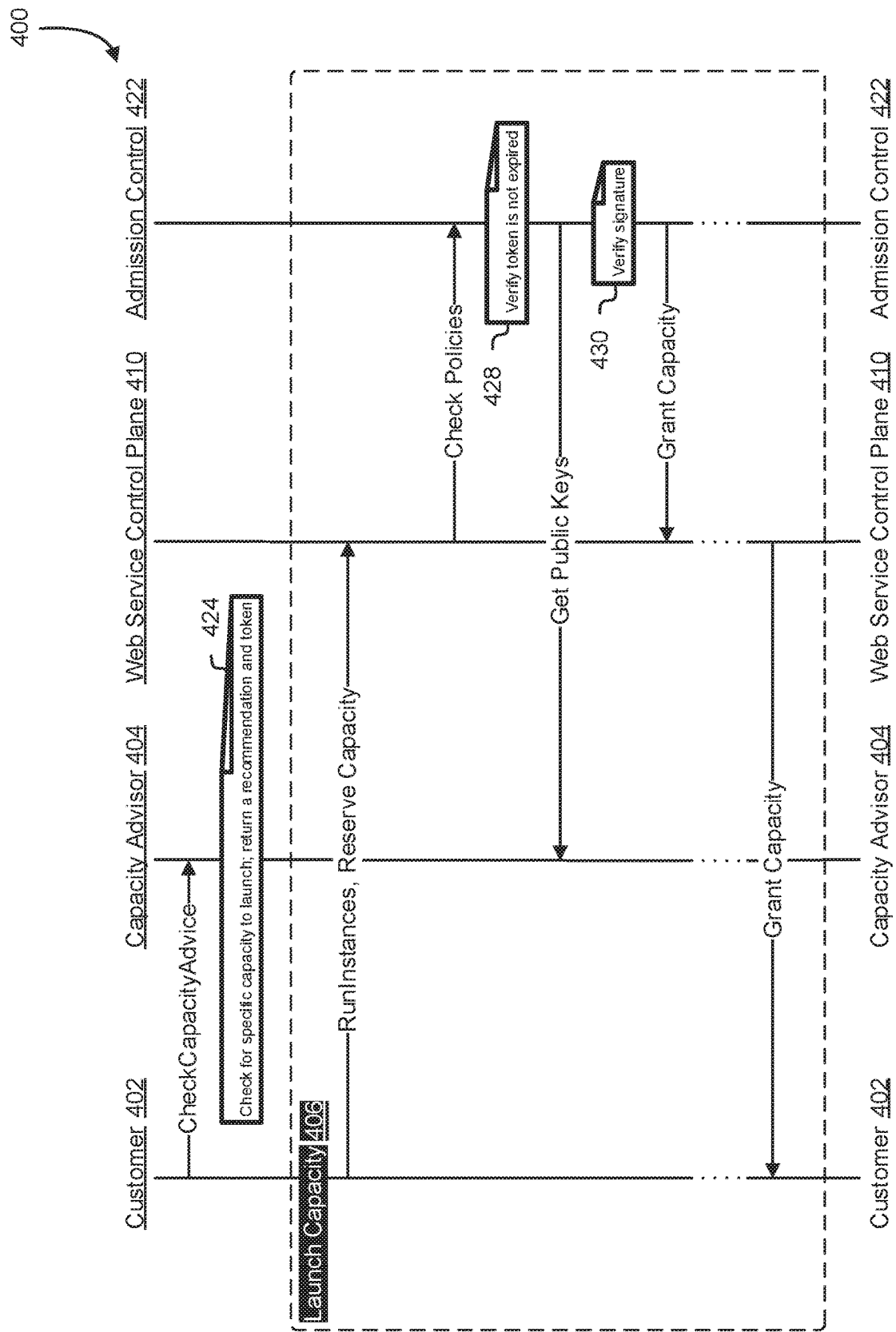
FIG. 4 is a swim diagram that illustrates an example of processing and granting a capacity request in accordance with an embodiment.

FIG. 4 is a swim diagram illustrating an example of a process 400 for processing and granting a capacity request in accordance with various embodiments. Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 8:
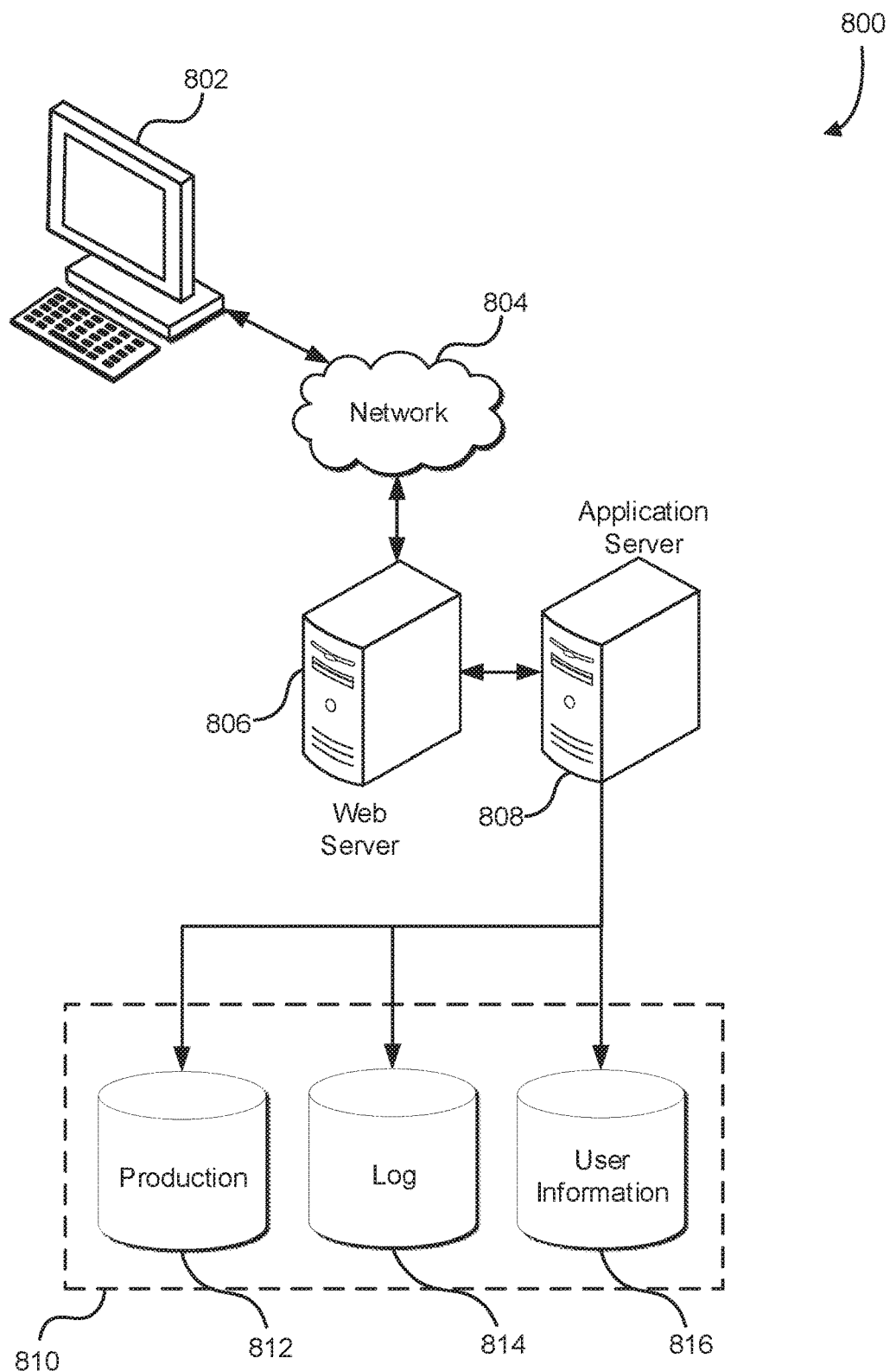
FIG. 8 illustrates a system in which various embodiments can be implemented.

For example, some or all of process 400 may be performed by any suitable system, such as a server in a data center, by various components of the system 800 described in conjunction with FIG. 8, such as the web server 806 or the application server 808, by multiple computing devices in a distributed system of a computing resource service provider, or by any electronic client device such as the electronic client device 802. The process 400 includes a series of operations wherein a capacity request is processed and granted.

The customer 402, which may be denoted as the client, may be any entity operable to access systems and/or services such as the capacity advisor 404, web service control plane 410, and admission control service 422. In an embodiment, the customer 402 is the same as or different from the client 102 described in connection with FIG. 1. In various embodiments, the customer 402 may request resources to perform various functions and operations. The customer 402 may utilize a recommendation request, which may be denoted as a capacity request, comprising various criteria, for a recommendation of resources to perform the various functions and operations. In some examples, the various criteria can include various desired factors, such as memory requirements, storage requirements, processing capabilities, graphical capabilities, and/or variations thereof. In some embodiments, the recommendation request may be submitted to the capacity advisor 404 via an API call (e.g., CheckCapacityRequest( )) from the customer 402.

In an embodiment, the capacity advisor 404 is the same as or different from the capacity advisor 104 described in connection with FIG. 1. The capacity advisor 404 may check 424 for specific capacity to launch based on the recommendation request submitted by the customer 402. In some embodiments, the capacity advisor 404 may identify various capacity configurations that satisfy the recommendation request. The capacity advisor 404 may present the various configurations to the customer 402; the customer 402 may chose a specific configuration to utilize. The capacity advisor 404 may then return a recommendation and a token, which may be denoted as a capacity authorization token, comprising access to the specific capacity; e.g., the specific capacity may be determined by the capacity advisor 404 or chosen by the customer 402. Further information regarding the generation of the recommendation and token can be found in the descriptions of FIG. 1 and FIG. 2.

The token may be utilized by the customer 402 to launch capacity 406. In various embodiments, the token may be submitted by the customer 402 to the web service control plane 410 via an API call (e.g., RunInstances( )). The web service control plane 410 may be a collection of computing resources configured to process and grant capacity requests, which may be in the format of an authorization token, such as the capacity authorization token 120 described in connection with FIG. 1. The web service control plane 410 may receive the token comprising a recommendation of a specific capacity; the web service control plane 410 may reserve the capacity indicated by the token. In some embodiments, the web service control plane 410 may reserve the capacity by storing an indication corresponding to the capacity to be reserved in a database, such as a database the capacity advisor 404 may comprise. Additionally, the capacity may be reserved for a set interval of time; following the interval of time, the capacity may be un-reserved to be utilized by one or more other entities.

The web service control plane 410 may check policies, such as access policies, to determine whether the customer 402 has sufficient role(s) and/or permission(s) for fulfillment of the launch request. Upon successful determination that the customer 402 has sufficient role(s) and/or permission(s), the web service control plane 410 may forward the request to the admission control service 422. The admission control service 422 may verify that the token is not expired 428, such as by checking a database that maintains records of issued tokens. In an embodiment, the admission control service 422 is the same as or different from the admission control service 204 described in connection with FIG. 2. The admission control service 422 may compare the token to a log of authorization tokens that one or more data storage systems may comprise. Based on the information associated with the log of authorization tokens, the admission control service 422 may determine that the token is valid and unexpired. The admission control service 422 may get public cryptographic keys from the capacity advisor 404 to verify the digital signatures of the token. The admission control service 422 may utilize the public cryptographic keys to verify the digital signatures the token may comprise; following a verification of the digital signatures, the token may be denoted as admissible, and the capacity may be granted to the web service control plane 410.

The web service control plane 410 may then grant capacity access to the customer 402 from a service such as the fleet 212 described in connection with FIG. 2. In some embodiments, the web service control plane 410 may grant capacity by causing various resources to be launched and/or instantiated for the customer 402; the web service control plane 410 may grant capacity by utilizing the indication stored by the web service control plane 410 of the reserved capacity. Additionally, in some embodiments, the web service control plane 410 may grant capacity by providing the customer 402 with a launch request in which the customer 402 can access and utilize the capacity. Further information regarding the processing of a capacity request with a token can be found in the description of FIG. 2. It should be noted that one or more of the operations performed in the process 400 might be performed in various orders and combinations, including in parallel.

Figure 5:
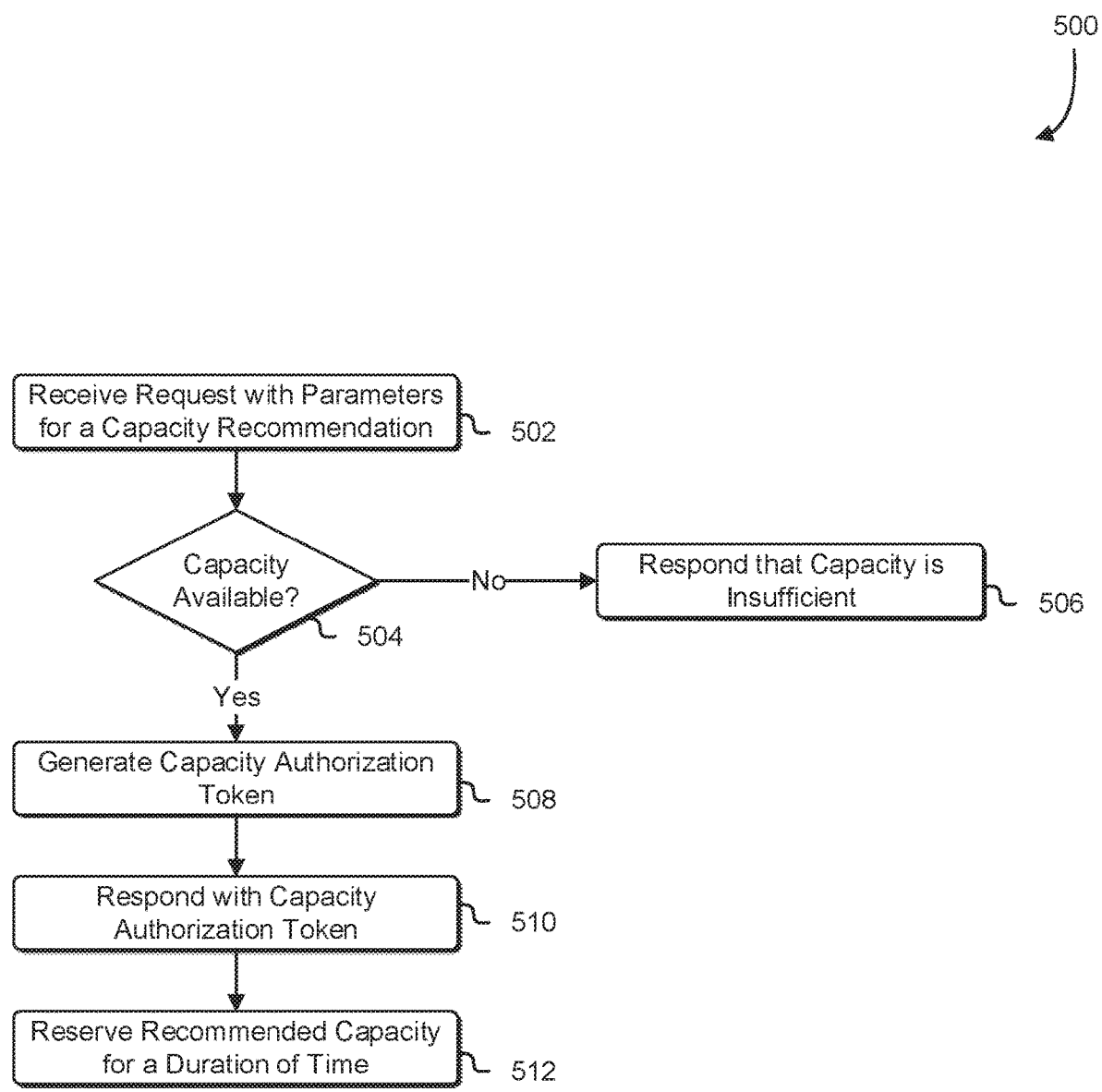
FIG. 5 is a flowchart that illustrates an example of processing a request for capacity in accordance with an embodiment.

FIG. 5 is a flowchart illustrating an example of a process 500 for generating a capacity authorization token in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 500 may be performed by any suitable system, such as a server in a data center, by various components of the system 800 described in conjunction with FIG. 8, such as the web server 806 or the application server 808, by multiple computing devices in a distributed system of a computing resource service provider, by any electronic client device such as the electronic client device 802, or by a system such as the capacity advisor 104 described in connection with FIG. 1. In 502, the system performing the process 500 receives a request with parameters for a capacity recommendation. The system may receive the request through one or more interfaces, such as an API. Additionally, the request may originate from a system such as the client 102 described in connection with FIG. 1. In various embodiments, the request may comprise various parameters and/or criteria for a desired capacity. In some examples, the various criteria can include various desired factors, such as memory requirements, storage requirements, processing capabilities, graphical capabilities, and/or variations thereof.

In 504, the system performing the process 500 may determine if capacity is available. In various embodiments, the system may determine if capacity is available by iterating through the resources from which the capacity is to be granted, such as the fleet 212 described in connection with FIG. 2, and determining if enough resources are available to satisfy the desired capacity requirements. In some examples, the system may determine if capacity is available by determining the usage capacity of the resources from which the capacity is to be granted; in various embodiments, usage capacity may refer to the current usage of the resources, projected usage of the resources, forecasted usage of the resources, and/or variations thereof. In 506, if no capacity is available, the system may respond that capacity is insufficient. In some embodiments, capacity may be insufficient if there is no longer enough capacity to satisfy the desired capacity requirements specified in the received request.

If there is capacity available, in 508, the system may generate a capacity authorization token. In various embodiments, a capacity authorization token may be an authorization token that authorizes the user of the token to access a specific set of resources, such as a set of virtual machine instances. In some examples, a capacity authorization token may comprise authorization tokens such as JSON Web Tokens, and/or various other access tokens. Additionally, a capacity authorization token may comprise information regarding access to the specific set of resources, such as type of virtual machine instance, quantity of virtual machine instances, and/or variations thereof.

In 510, the system performing the process 500 may respond with a capacity authorization token. In various embodiments, the system may respond with the generated capacity authorization token by transmitting the token to the requestor of the received request through one or more interfaces and/or applications. In 512, the system may then reserve recommended capacity for a duration of time. In some embodiments, the system may reserve the capacity by storing an indication corresponding to the resources specified in the capacity authorization token in one or more data storage systems the system may comprise. The indication may be utilized by the system in order to identify capacity that is already reserved and allocated to an active token such that duplicate requests may be identified to ensure that resources are not reserved to multiple entities simultaneously (e.g., "double booked"). For example, the system may receive a request for a first capacity of a resource of resource type A. The system may store an indication corresponding to the first capacity of the type A resource (e.g., in a local data store, such as the reservations data store 108 of FIG. 1). The system may then receive a different request (from the same or different customer as the request of 502) for a second capacity of the type A resource; the system may determine that reserving the second capacity would overlap/encroach on the reservation of the first capacity already reserved, and as a result, the system may deny the different request.

Additionally, the capacity may be reserved for a set interval of time; following the interval of time, the capacity may be un-reserved to be utilized by one or more other entities. It should be noted that, in various embodiments, one or more of the operations performed in the process 500 might be performed in various orders and combinations, including in parallel.

Figure 6:
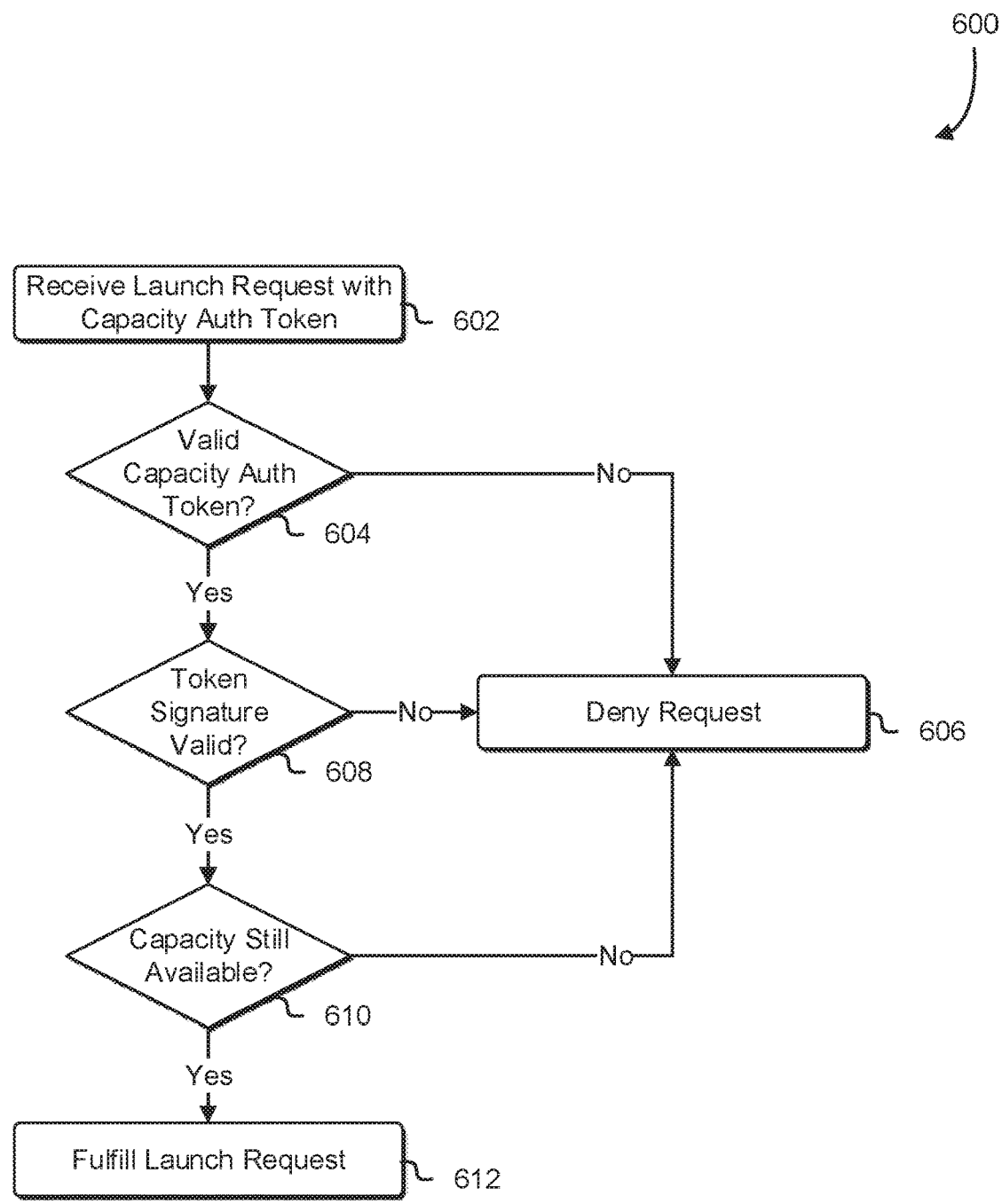
FIG. 6 is a flowchart that illustrates an example of processing a launch request with a capacity authorization token in accordance with an embodiment.

FIG. 6 is a flowchart illustrating an example of a process 600 for redeeming a capacity authorization token generated by the process 500 of FIG. 5 in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as a server in a data center, by various components of the system 800 described in conjunction with FIG. 8, such as the web server 806 or the application server 808, by multiple computing devices in a distributed system of a computing resource service provider, by any electronic client device such as the electronic client device 802, or by a system such as the admission control service 204 described in connection with FIG. 2. In an embodiment, in 602, the system performing the process 600 receives a launch request with a capacity authorization token. In some examples, the capacity authorization token may be an authorization token that authorizes the user of the token to access a specific set of resources. In some examples, a capacity authorization token may comprise authorization tokens such as JSON Web Tokens, and/or various other access tokens. In an embodiment, the received capacity authorization token is the same as or different from the generated capacity authorization token described in connection with FIG. 5.

In 604, the system performing the process 600 may determine the validity of the capacity authorization token. In some embodiments, the system may determine the validity by comparing the capacity authorization token to a log of authorization tokens from one or more data storage services. Based on the information associated with the log of authorization tokens, the system may determine that the capacity authorization token is valid and unexpired. For example, the generation of the capacity authorization token may comprise generating a log entry for the capacity authorization token in the log of authorization tokens, and the system may use the log entry of the generated capacity authorization token to verify the generated capacity authorization token. For example, if the capacity authentication token is not found in the log, then the capacity authentication token may be deemed invalid. Likewise, if the capacity authentication token is expired, the capacity authentication token may be determined invalid. If the capacity authentication token is determined invalid, the system may proceed to 606 to deny the request.

Otherwise, if the capacity authentication token is determined to be valid, in 608, the system performing the process 600 may then verify if the capacity authorization token signature is valid. The system may retrieve public cryptographic keys from one or more other services to verify the digital signatures of the capacity authorization token. The system may utilize the retrieved public cryptographic keys to verify the digital signatures the capacity authorization token may comprise; following a verification of the digital signatures, the system may determine if capacity is still available 610. As an example, if the digital signature or the capacity authentication token has been tampered with (e.g., edited to change the quantity of resources allocated) since the capacity authentication token was first generated and signed, the digital signature will likely not be a match. In such a case, the system may determine that the digital signature presented with the capacity authentication token is invalid. Likewise, if the digital signature is determined to be invalid, the system may proceed to 606 to deny the request.

Otherwise, if the token signature of the capacity authorization token is valid, the system performing the process 600, in 610, may determine whether capacity is still available. For example, if insufficient reserved resources associated with the capacity authentication token remain to fulfill the request (e.g., the request asks for more than are remaining), the system may proceed to 606 to deny the request. In various embodiments, the system may deny the request by not allocating any resources to fulfill the request. In some implementations, if insufficient reserved resources are available but there are sufficient unreserved resources available, the system may fulfill the launch request by allocating/launching the reserved resources and any difference from the unreserved available resources.

Additionally, the system may determine whether capacity is still available based on information the capacity authorization token comprises. In some examples, the capacity token authorization token may comprise information denoting the resources utilized by a customer of the computing resource service provider at the time of the request for the capacity authorization token by the customer. The system may compare the current resource utilization of the customer to the resources utilized by the customer at the time of the request for the capacity authorization token by the customer, and determine whether capacity is still available. For example, a customer may utilize 10 virtual machine instances. The customer may then submit a request and receive a capacity authorization token for 10 additional virtual machine instances. In the meantime, the customer's services with the computing resource service provider may also include an autoscaling service that may automatically scale up or down the customer's virtual machine instances, which may impact whether the customer is able to redeem the capacity authorization token for the full amount. For example, in the example above, if the autoscaling service of the customer scales up the customer's resources by 6 virtual machine instances and the customer subsequently submits the capacity authorization token to redeem its 10 additional virtual machine instances, the system may determine that only 4 of the additional virtual machine instances remain (the 6 having already been used up as a result of the autoscaling operation by the autoscaling service). As a result, the system may reject the customer request for the additional 10 virtual machine instances. In some embodiments, the capacity authorization token includes information corresponding to current resource usage by the customer at the time the capacity authorization token is issued, and in 610, the system takes into account whether the customer's current usage (at time of token redemption) differs from this information.

If the capacity authorization token is valid, the token signature of the capacity authorization token is valid, and capacity is available, in 612, the system may fulfill the launch request received in 602. In some embodiments, the system may fulfill the launch request by instantiating the resources indicated by the launch request. For example, the launch request may comprise a request for a set of virtual machine instances of a specific type; to fulfill the launch request, the requested virtual machine instances of the specific requested type may be instantiated to be utilized by a system, such as the system transmitting the received request in process 500 as depicted in FIG. 5. It should be noted that one or more of the operations performed in the process 600 might be performed in various orders and combinations, including in parallel. For example, the determinations of 604, 608, and 610 may be performed in any order or in parallel.

FIG. 7 shows a webpage 700, which may be displayed by an application executed by a computing system, such as the client 102, described in connection with FIG. 1, enabling a customer to interact with a capacity advisor service operated by a computing resource service provider. As illustrated in FIG. 7, the webpage 700 includes various graphical user interface elements that enable customers to provide workload requirements 702 for a customer workload or application to be executed by a set of virtual machine instances provided by the computing resources of the computing resource service provider. Furthermore, the capacity advisor service may provide alternative configurations of virtual machine instance types to the customer through the webpage 700, which may be selected by the customer to execute the customer workload or application. In various embodiments, the customer interacts with the capacity advisor service through the webpage 700. The webpage 700 may be displayed by various applications, such as a mobile application or web browser.

As illustrated in FIG. 7, the webpage 700 may contain a graphical user interface element configured as input boxes configured to enable the customer to enter a desired value for one or more workload requirements 702, which may be used by the capacity advisor service to determine alternative configurations with sufficient capacity to satisfy the workload requirements. The workload requirements may correspond to a particular capacity or unit of capacity associated with virtual machine instances capable of executing the customer workload or application. For example, the customer may input a number of requirements for the execution of the customer workload or application, such as a number of processing cores 704 of a set of vCPUs, a total capacity of memory 706, a total capacity of storage space 708 and total compute units 710.

For example, as depicted in FIG. 7, a customer has specified as minimum workload requirements 702, that he/she needs 24 processing cores 704, 128 gigabytes (GB) total capacity of memory, 1.5 GB total capacity of storage space 708, and 107 total compute units 710. In this embodiment, the webpage 700 also includes a graphical user interface element configured as a "Request Recommendation" button 712. The request recommendation button 712 may be a graphical user interface element of the webpage 700 where the underlying code of the webpage 700 is configured such that selection by an input device of the request recommendation button 712 causes the webpage 700 to display to the customer a list of different types of virtual machine instances suitable for executing the customer workload or application. As can be seen in the example, the customer has clicked the request recommendation button 712 after inputting the workload requirements 702, and the capacity advisor has provided alternatives 714-16 in its recommendation below.

In this embodiment, the webpage 700 contains a prompt suggesting alternative configurations of virtual machine instances in a group of virtual machine instances configured to execute the customer workload or application. The alternatives, comprising first alternative 714 and second alternative 716, may have been generated by the capacity advisor based at least in part on capacity information (e.g., information received from services 110-114 of FIG. 1) and the workload requirements 702. As can be seen in FIG. 7, the capacity advisor in this example has proposed, as the first alternative 714, that in the "PNW1" zone, "4 Standard Mediums" and "1 Memory Large" with a total of 110 compute units is suitable for meeting the customer's specified workload requirements. Similarly, in the example shown in FIG. 7, the capacity advisor has proposed, as the second alternative 716, that in the "GLR5" zone, "3 Computer XLs" and "1 Memory Medium" with a total of 115 compute units is also suitable for meeting the customer's workload requirements. In this manner, the customer can be provided with alternative configurations that are capable of performing the customer's workload, some of which the customer may not have realized were available.

The capacity advisor may determine to include the particular alternative configurations of virtual machine instance types in its recommendation based at least in part on customer preference, popularity among customers, features of the virtual machine instances, features of the virtual machine instances selected by the customer, capacity requirements selected by the customer, an administrator associated with the customer workload or application, benchmarks or other scores associated with the virtual machine instance types, capacity of the virtual machine instance types, or other information suitable for providing requirements associated with a customer workload or application. As seen in FIG. 7, the capacity advisor may present the alternatives 714-16 to the customer for selection via a form control of the webpage 700, such as receive token buttons 718A-18B.

The customer may select the "Receive Token" button 718A, corresponding to the first alternative 714. Alternatively, the customer may select the "Receive Token" button 718B, corresponding to the second alternative 716. Once the customer has made a selection using the webpage 700, the application displaying the webpage 700 may submit a request, such as an HTTP request, to the capacity advisor service to generate a capacity authorization token corresponding to the chosen alternative. The request may be transmitted to one or more servers of the capacity advisor service operated by the computing resource service provider. Furthermore, the capacity advisor service may obtain additional information from one or more other services in order to complete the request from the customer. The token may then be received by the customer through one or more additional interfaces.

Note that the graphical user interface of the webpage 700 is presented for illustrative purposes only, and implementations of the systems of the present disclosure may implement user interfaces different from that depicted in FIG. 7; for example, an implemented user interface may not be web-based or may have more, fewer, or different interface controls and/or information from those depicted in the webpage 700. As a more specific example, the implemented user interface may lack a capacity advisor recommendation section; in this example, the customer may submit his/her workload requirements to the capacity advisor and, in response, automatically receive a token to the first alternative 714. Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of cloud computing, by allowing implementing a tool that allows customers of a computing resource service provider to determine whether needed computing resources are available prior to when they are actually needed. (2) Techniques described and suggested in the present disclosure improve the field of computing, especially the field of cloud computing, by allowing providing a tool to customers that issues a token for computing resources capable of meeting the customers' workload requirements using types of resources the customer may not have considered. (3) Additionally, techniques described and suggested in the present disclosure improve the efficiency of distributed computing systems by reserving anticipated computing capacity for customers without having resources running during idle periods. (4) Moreover, techniques described and suggested in the present disclosure are necessarily rooted in computer technology in order to overcome problems specifically arising with computing resource service providers by allowing customers to reserve capacity before it is actually needed by the customers, thereby minimizing insufficient capacity exceptions at times when the customers need the capacity.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system 800 includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network 804 includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed in detail. In an embodiment, communication over the network 804 is enabled by wired and/or wireless connections and combinations thereof. In an embodiment, the network 804 includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests over a network). As used, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object level interfaces. The application server 808 can include any appropriate hardware, software and firmware for integrating with the data store 810 as needed to execute aspects of one or more applications for the electronic client device 802, handling some or all of the data access and business logic for an application.

In an embodiment, the application server 808 provides access control services in cooperation with the data store 810 and generates content including, but not limited to, text, graphics, audio, video, and/or other content that is provided to a user, associated with the client device by the web server 806 in the form of HyperText Markup Language (HTML), Extensible Markup Language (XML), JavaScript, Cascading Style Sheets (CSS), JavaScript Object Notation (JSON), and/or another appropriate client-side or other structured language. Content transferred to a client device, in an embodiment, is processed by the electronic client device 802 to provide the content in one or more forms including, but not limited to, forms that are perceptible to the user audibly, visually, and/or through other senses. The handling of all requests and responses, as well as the delivery of content between the electronic client device 802 and the application server 808, in an embodiment, is handled by the web server 806 using PHP: Hypertext Preprocessor (PHP), Python, Ruby, Perl, Java, HTML, XML, JSON, and/or another appropriate server-side structured language in this example. In an embodiment, operations described as being performed by a single device are performed collectively by multiple devices that form a distributed and/or virtual system.

The data store 810, in an embodiment, includes several separate data tables, databases, data documents, dynamic data storage schemes, and/or other data storage mechanisms and media for storing data relating to a particular aspect of the present disclosure. In an embodiment, the data store 810 includes mechanisms for storing production data 812 and user information 816, which are used to serve content for the production side. The data store 810 also is shown to include a mechanism for storing log data 814, which is used, in an embodiment, for reporting, computing resource management, analysis, or other such purposes. In an embodiment, other aspects such as page image information and access rights information (e.g., access control policies or other encodings of permissions) are stored in the data store 810 in any of the above listed mechanisms as appropriate or in additional mechanisms in the data store 810.

The data store 810, in an embodiment, is operable, through logic associated therewith, to receive instructions from the application server 808 and obtain, update, or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described or may be provided by a content management system (CMS) operating on, or under the control of, the application server 808. In an embodiment, a user, through a device operated by the user, submits a search request for a certain type of item. In this example, the data store 810 accesses the user information 816 to verify the identity of the user, accesses the catalog detail information to obtain information about items of that type, and returns the information to the user, such as in a results listing on a web page that the user is views via a browser on the electronic client device 802. Continuing with the example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically will include an operating system that provides executable program instructions for the general administration and operation of that server and includes a computer-readable storage medium (e.g., a hard disk, random access memory, read only memory, etc.) storing instructions that if executed (i.e., as a result of being executed) by a processor of the server cause or otherwise allow the server to perform its intended functions (e.g., the functions are performed as a result of one or more processors of the server executing instructions stored on a computer-readable storage medium).

The system, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating systems, which in some cases can include one or more user computers, computing devices, or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, the system 800 utilizes at least one network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols. The network 804, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In an embodiment, the system 800 utilizes a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system 800 includes a variety of data stores and other memory and storage media as discussed above. These can reside in a variety of locations, such as on a storage medium local to (and/or resident in) one or more of the computers or remote from any or all of the computers across the network 804. In an embodiment, the information resides in a storage-area network (SAN) familiar to those skilled in the art, and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit (CPU or "processor"), at least one input device (e.g., a mouse, keyboard, controller, touch screen, or keypad), and at least one output device (e.g., a display device, printer, or speaker), at least one storage device, such as a disk drive, an optical storage device, or a solid-state storage device such as random access memory (RAM) or read-only memory (ROM), as well as removable media devices, memory cards, flash cards, etc., and various combinations.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, system 800 and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the disclosed embodiments (especially in the context of the following claims) are to be construed to cover both the singular and the plural, unless otherwise indicated or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. In embodiment, a process such as those processes described (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium stores instructions and a main CPU executes some of the instructions while a graphics processor unit executes other of the instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implements an embodiment of the present disclosure is a single device and, in another embodiment, is a distributed computer system comprising multiple devices that operate differently such that the distributed computer system performs the operations described and such that a single device does not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   receiving, from a requestor via an application programming interface, a first request for a capacity pool recommendation, the request specifying a set of capacity constraints;
   determining the capacity pool recommendation based on the set of capacity constraints, available capacity for a set of virtual machine instances across a set of computing devices of a computing resource service provider, and a record of capacity reservations currently associated with a set of granted capacity authorization tokens, wherein the capacity pool recommendation includes:
      a type of virtual machine instance; and
      a quantity of the set of available virtual machine instances that fulfill the set of capacity constraints;
   generating a capacity authorization token that encodes the capacity pool recommendation, the capacity authorization token digitally signed using a cryptographic key of the computing resource service provider, the capacity authorization token being valid for a duration of time;
   reserving the quantity of the set of available virtual machine instances for the duration of time in the record of capacity reservations;
   providing, to the requestor, the capacity authorization token in response to the first request;
   receiving a second request to launch one or more virtual machine instances;
   determining that the second request includes the capacity authorization token;
   validating that the duration of time of the capacity authorization token has not expired;
   validating, based on the cryptographic key, that a digital signature of the capacity authorization token is valid;
   validating that the capacity authorization token is at least partially unredeemed; and
   as a result of the validating, at least partially redeeming the capacity authorization token by launching a subset of the set of available virtual machine instances, a size of the subset constrained at least in part by the quantity.

2. The computer-implemented method of claim 1, wherein the capacity authorization token is a JavaScript Object Notation Web Token.

3. The computer-implemented method of claim 1, wherein the set of capacity constraints includes one or more of:
   the type of virtual machine instance,
   a quantity of virtual machine instances sought, or
   a geographic zone where the set of available virtual machine instances are to be located.

4. The computer-implemented method of claim 1, wherein:
   validating that the capacity authorization token is unredeemed includes determining that the capacity authorization token has been redeemed for a first quantity of the set of available virtual machine instances and is unredeemed for a second quantity of the set of available virtual machine instances; and
   the size of the subset corresponds to the second quantity.

5. The computer-implemented method of claim 1, wherein:
   the first request further specifies a requested utility for the capacity authorization token; and the capacity authorization token further encodes the requested utility for the capacity authorization token.

6. A system, comprising:
one or more processors; and
memory including executable instructions that, if executed by the one or more processors, cause the system to:
  obtain a first request to reserve a quantity of resources that comply with a constraint specified in the first request;
  determine, based on current capacity usage across a set of computing devices and a record of capacity reservations currently associated with a set of granted tokens, a set of available resources that fulfills the constraint;
  generate a token that encodes the reservation of the quantity of resources, the token associated with an expiration;
  reserve the quantity of resources in the record of capacity reservations;
  provide, in response to the first request, the token;
  obtain a second request to provide access to at least one resource of the set of available resources;
  as a result of a determination that the second request includes the token, perform a validation of the token;
  determine, based at least in part on the validation, that the token is expired;
  determine that the quantity of resources is still available;
  associate an additional token with the quantity of resources;
  receive a third request to provide access to the at least one resource that includes the additional token; and
  provide access to the at least one resource as a result of successful validation of the additional token.

7. The system of claim 6, wherein the executable instructions that cause the system to determine the set of available resources further include instructions that further cause the system to determine the set of available resources from a set of resources within a geographic zone specified by the constraint.

8. The system of claim 6, wherein the executable instructions that cause the system to perform the validation of the token further include instructions that cause the system to:
  determine, based on the expiration, whether the token is unexpired; and
  determine, using a cryptographic key of the system, whether a digital signature included with the token is valid.

9. The system of claim 6, wherein the executable instructions that cause the system to perform the validation of the token further include instructions that further cause the system to verify that the at least one resource does not exceed an unredeemed quantity of available computing resources associated with the token.

10. The system of claim 6, wherein the first request, from the requestor, for the reservation specifies:
  to reserve a first quantity of a first type of computing resource; and
  to reserve a second quantity of a second type of computing resource different from the first type.

11. The system of claim 10, wherein:
the first type of computing resource corresponds to a type of virtual machine resource; and
the second type of computing resource corresponds to a type of storage volume.

12. The system of claim 10, wherein the constraint specifies that availability of the second quantity of the second type of computing resource is a condition precedent to reserve the first quantity of the first type of computing resource.

13. The system of claim 6, wherein the executable instructions that cause the system to reserve the quantity of resources includes storing an indication corresponding to the reservation of the quantity of resources specified in the token in one or more data storage systems of the system.

14. The system of claim 6, wherein the executable instructions further include instructions that cause the system to:
  obtain, from a service that monitors the set of available resources, information that indicates that the set of available resources are available; and
  determine a computing resource type based on the information.

15. A non-transitory computer-readable storage medium having stored thereon executable instructions that, if executed by one or more processors of a computer system, cause the computer system to at least:
  receive a first request to reserve a computing resource that complies with specified criteria, the specified criteria including at least a quantity of the computing resource;
  determine, based on a set of available computing resources, data representing provided capacity advice, and the specified criteria, a computing resource type that:
    complies with the specified criteria; and
    has at least the quantity available across the set of available computing resources while accounting for the provided capacity advice;
  reserve, for a duration of time, the quantity of the computing resource from the set of available computing resources in the data representing provided capacity advice;
  generate a token that encodes information that specifies at least:
    the duration of time;
    the computing resource type; and
    the quantity;
  generate a digital signature of the token using a cryptographic key; and
  provide, in response to the first request, the token and the digital signature.

16. The non-transitory computer-readable storage medium of claim 15, wherein the specified criteria further includes at least one of:
  a minimum amount of processing capability,
  a minimum amount of storage space, or
  a minimum amount of memory.

17. The non-transitory computer-readable storage medium of claim 15, wherein the executable instructions further include instructions that cause the computer system to determine the duration based on a customer identity associated with the first request.

18. The non-transitory computer-readable storage medium of claim 15, wherein:
  the specified criteria further includes a start time indicating a future time at which the quantity of the computing resource is to be provided; and
  the duration of time begins at the start time.

19. The non-transitory computer-readable storage medium of claim 15, wherein:
  the executable instructions further include instructions that further cause the computer system to obtain, from a service that monitors the set of available computing resources, information that indicates that the set of available computing resources are available; and the executable instructions that cause the computer system to determine the computing resource type further cause the computer system to determine the computing resource type based on the information.

20. The non-transitory computer-readable storage medium of claim 19, wherein the executable instructions further include instructions that cause the computer system to determine the duration based on a size of the set of available computing resources indicated in the information.

* * * * *